United States Patent
Strawder

[11] Patent Number: 5,473,664
[45] Date of Patent: * Dec. 5, 1995

[54] METHOD OF AND APPARATUS FOR POSITIONING A PATIENT FOR THE TAKING OF AN X-RAY

[76] Inventor: Glenn G. Strawder, 3405 Robey Ter., Apt. 302, Silver Spring, Md. 20904

[*] Notice: The portion of the term of this patent subsequent to Jul. 6, 2010, has been disclaimed.

[21] Appl. No.: 265,111

[22] Filed: Jun. 24, 1994

[51] Int. Cl.⁶ .................................................. G03B 42/04
[52] U.S. Cl. ........................ 378/177; 378/167; 378/169
[58] Field of Search ..................... 378/167, 169, 378/170, 172, 177, 178, 180, 182, 187

[56] References Cited

U.S. PATENT DOCUMENTS

| | | |
|---|---|---|
| 2,478,597 | 8/1949 | Scarpellino . |
| 3,293,430 | 12/1966 | Wustner . |
| 3,622,783 | 11/1971 | Miller ........................................ 250/66 |
| 3,916,207 | 10/1975 | Reed ........................................ 250/444 |
| 4,114,044 | 9/1978 | Chiulli ..................................... 378/167 |
| 4,333,014 | 6/1982 | Renshaw ................................. 250/521 |
| 4,352,197 | 9/1982 | Waerve .................................... 378/177 |
| 4,399,552 | 8/1983 | Renshaw ................................. 378/167 |
| 4,414,683 | 11/1983 | Robinson ................................. 378/177 |
| 4,455,672 | 6/1984 | Hahn ........................................ 378/181 |
| 4,700,373 | 10/1987 | Miller ...................................... 378/177 |
| 5,022,065 | 6/1991 | Wijkstrom ............................... 378/187 |
| 5,133,000 | 7/1992 | Moller ..................................... 378/177 |
| 5,226,068 | 7/1993 | Strawder ................................. 378/177 |

Primary Examiner—David P. Porta
Assistant Examiner—Don Wong
Attorney, Agent, or Firm—William D. Hall

[57] ABSTRACT

A device for positioning a patient adjacent an X-ray cassette has a plate on which a part of a human body may be located and a socket adjacent the plate. The socket has at least two slots. The two slots have different widths for receiving cassettes of different sizes. However, only one size of cassette is used at a time. The plate may be slipped between a part of the human body and a backboard to which such body is strapped. This positions a part of the body adjacent a cassette in one of said slots. The plate may also have a slanted surface to facilitate positioning a part of the body on the plate.

19 Claims, 2 Drawing Sheets

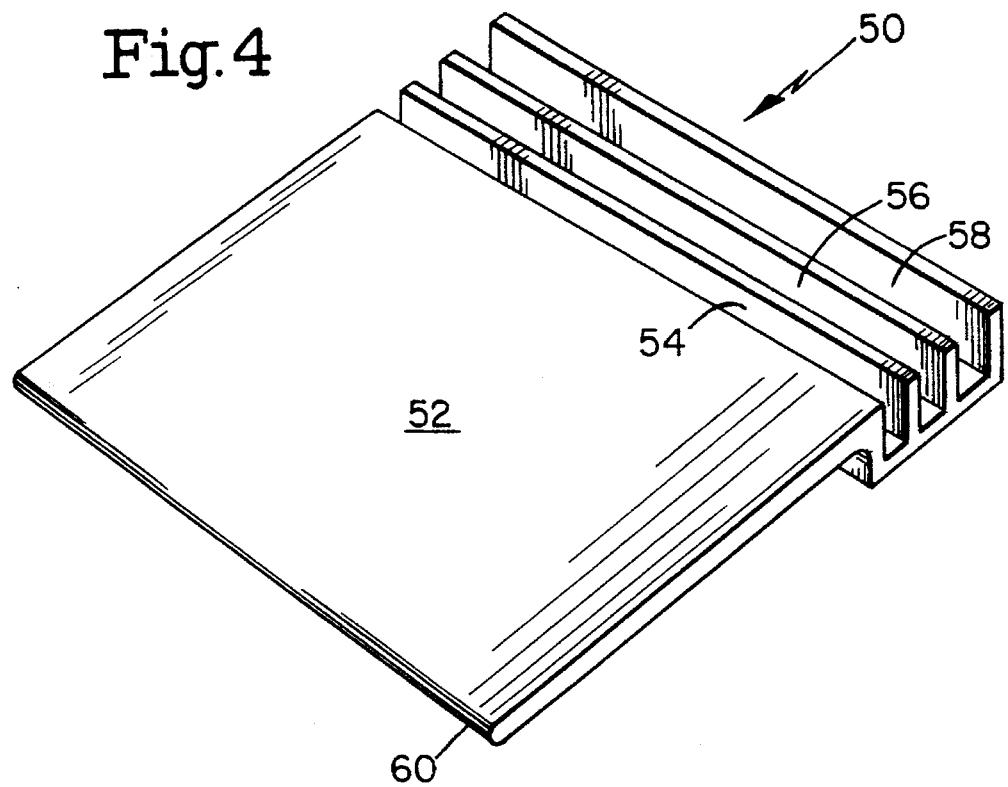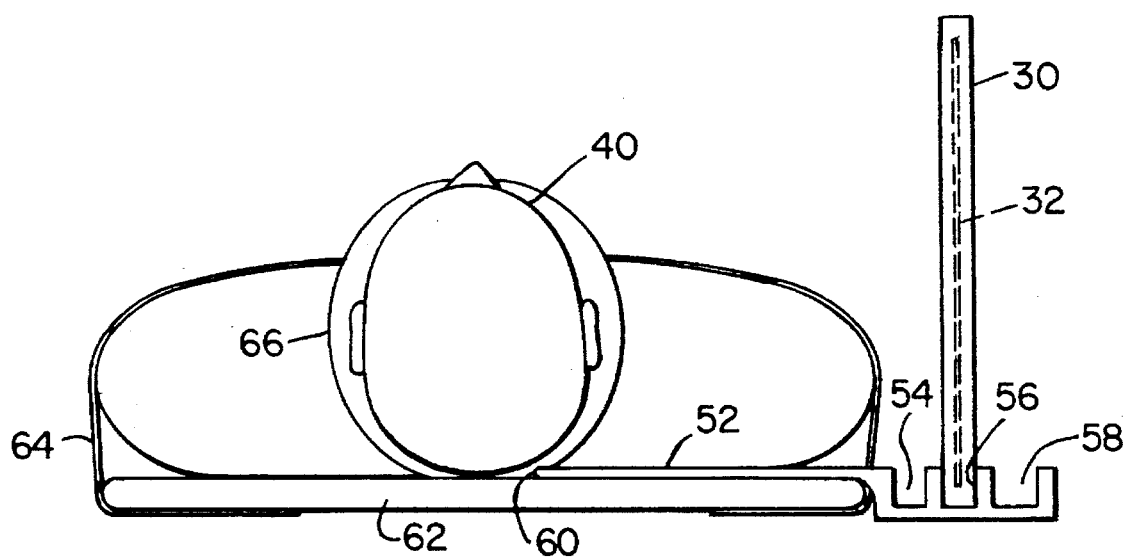

5,473,664

METHOD OF AND APPARATUS FOR POSITIONING A PATIENT FOR THE TAKING OF AN X-RAY

RELATED PATENT

This invention is related to the subject matter of my U.S. Pat. No. 5,226,068 issued Jul. 6, 1993.

BACKGROUND OF THE INVENTION

The prior art discloses means for positioning a patient adjacent a cassette that holds and X-ray film. For example Waerve, U.S. Pat. No. 4,352,197 has a mounting device for positioning a cassette carrying an X-ray film between the patient and a table.

Scarpellino, U.S. Pat. No. 2,478,597 shows a "head and shoulder" rest for use in supporting body parts while X-rays are passed through the body.

Moreover, positioning devices for X-ray cassettes are shown in the following U.S. Patents: Wustner U.S. Pat. No. 3,293,430; Reed U.S. Pat. No. 3,916,207; Robinson U.S. Pat. No. 4,414,683; Miller U.S. Pat. No. 4,700,373 and Moller U.S. Pat. No. 5,133,000.

SUMMARY OF THE INVENTION

The invention includes a plate and a socket connected to the plate at one side of said plate. The socket has a plurality of parallel slots or cavities in it. These slots or cavities have different widths so as to receive X-ray cassettes of different sizes. Part of a human body to be X-rayed is placed on said plate and X-rays pass through said part and to said cassette. Since many X-ray cassettes have a film of smaller dimensions than the cross-section of the cassette, the fact that the cassette is in the slot insures that a portion of the part to be X-rayed is not cut-off on the X-ray film. In contrast, if the X-ray cassette rests on a table, as does the part (to be X-rayed), the portion of said part immediately adjacent the table will not appear on the film since the film in the cassette does not extend downward to the plane of the table. If, however, the cassette is in a slot that extends below the plane of the surface on which the part (to be X-rayed) rests, the entire part will appear on the X-ray film.

In one form of the invention the bottom of the plate has a taper extending from the lower to the upper side of the plate.

In another form of the invention, a patient who has been strapped to a backboard may be X-rayed by inserting said plate between the back of the patient and the backboard. A cassette is placed in one of the slots and an X-ray is taken.

BRIEF DESCRIPTION OF THE DRAWINGS

FIG. 4 is a perspective view of another form of the invention.

FIG. 5 shows how a patient is placed on the device of FIG. 4 in order to attain the position which is desired for X-ray purposes.

DETAILED DESCRIPTION OF THE INVENTION

Figure 1:
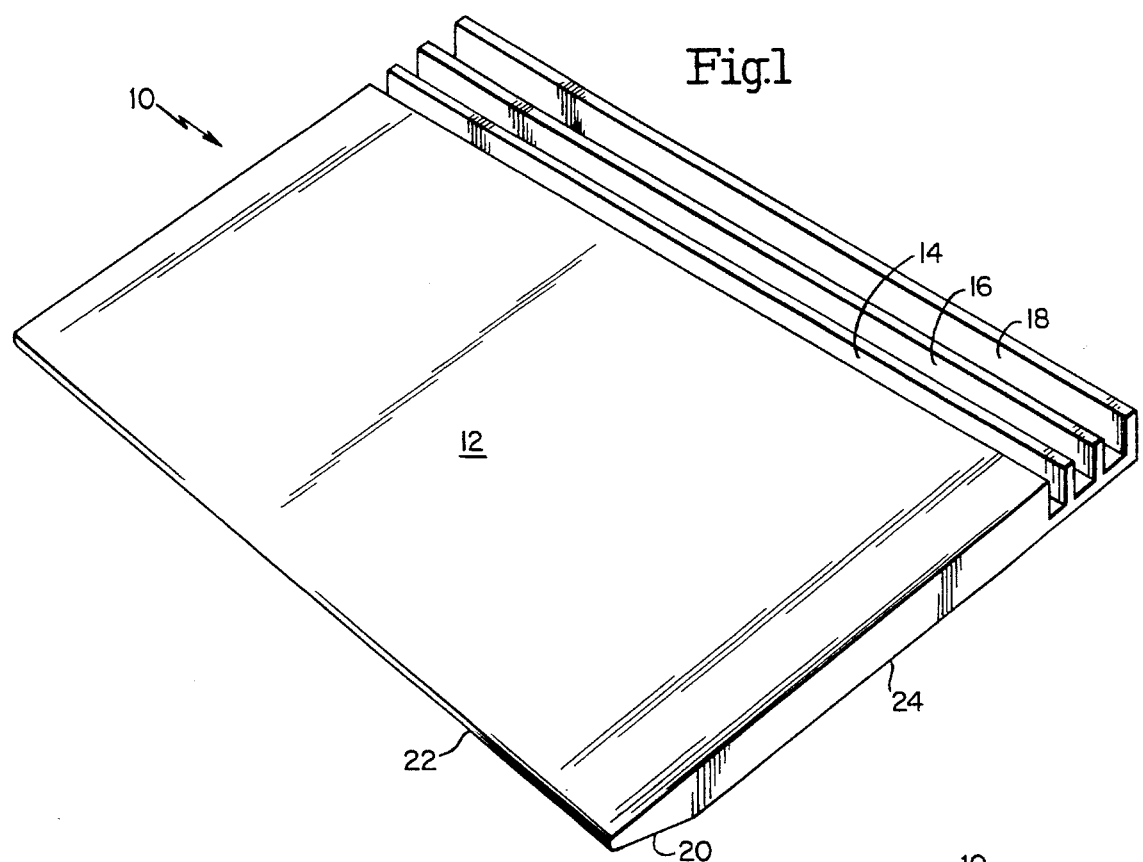
FIG. 1 is a perspective view of one form of the invention.

The device 10 of FIG. 1 is a single piece of plastic. The body member 24 has a taper 20, on the underside of the body 24. It terminates in a free end 22 which is not sharp (as that might injure the patient) but is slightly blunted. The device 10 has three slots or cavities 14, 16 and 18. These cavities form a socket extending laterally from one side of the device to the other side. These slots 14, 16 and 18 are of progressively greater widths so that there is a slot for each size of the cassette that may be used. The narrowest cassette fits in slot 14. Another cassette fits slot 18. A bed sheet 28 may be located between the patient 40 and holder 10.

Figure 2:
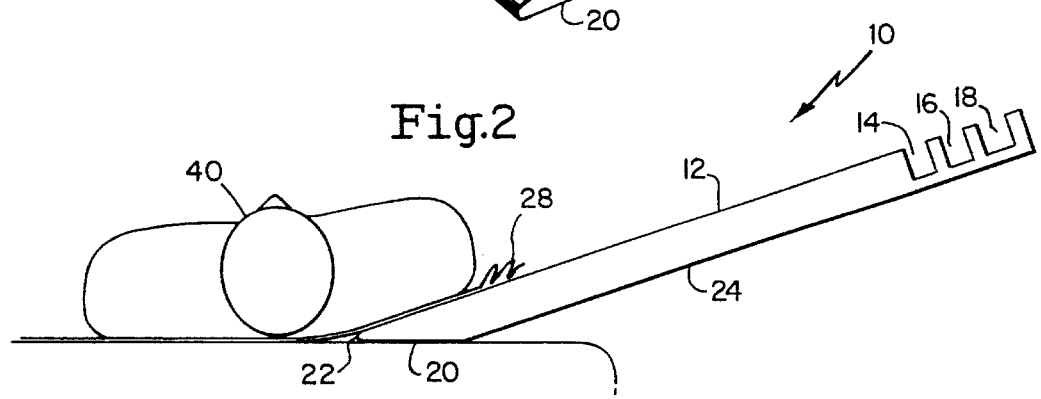
FIG. 2 illustrates how the device of FIG. 1 is used to guide the patient toward the desired position in which an X-ray can be taken.
Figure 3:
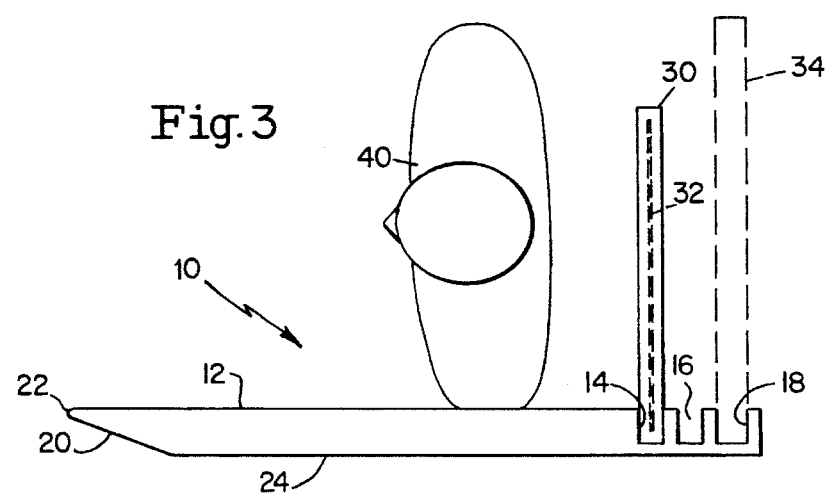
FIG. 3 illustrates a patient in his or her final position so that an X-ray may be taken.

The device of FIG. 1 is used to position a patient on the surface 12 as follows. The slanted portion 20 slides flat on surface 26 (which may be a table top or the floor, for example), and this aids in moving the patient onto surface 12 as shown in FIG. 2. The device 10 is then returned to the position wherein the bottom surface of body 24 is contiguous with the surface 26. The patient may then be moved to any desired orientation, as shown in FIG. 3, for taking the X-ray. While two cassettes 30 and 34 are shown in FIG. 3, only one is used at a time.

The device 10 of FIGS. 1 to 3 has particular utility when an X-ray of the chest or abdomen is to be X-rayed for patients not strapped to a backboard.

The modified form of FIG. 4 comprises a body 50 having a thin plate 60 with an upper surface 52. The device has three slots 54, 56 and 58 that are progressively wider as explained in the description of FIGS. 1 to 3. If a patient has been in an accident, he or she may be strapped, by straps 64, to a backboard 62. The straps 64 would be around the knees and thighs. If then it is desired to take X-ray pictures of the face, neck or head, the thin plate 60 is slid between the back of the patient 40 and the backboard 62. The surface 52 is long enough to extend under the back bone as shown in FIG. 5. Thus, the surface 52 is preferably about a foot long and the plate 60 is about ⅜ inches thick.

In both of the devices 10 and 50, the X-rays 70 are directed through the patient to the cassette 30 or 34 as the case may be. In both of devices 10 and 50, only one cassette is used at a time. Cassettes 30 and 34 have X-ray films 32 and 36 respectively.

Cassette 30 may be a screen type X-ray cassette and cassette 34 may be a grid type of cassette; however the details of the cassette is not a part of this invention.

There is an advantage in having the cassette in a slot that extends below the level of the surface (12 or 52 as the case may be). The reason is that in many cassettes the film does not extend to the edge of the cassette. Thus, if the cassette was mounted on surface (12 or 52 as the case may be), a portion of the patient immediately adjacent surface 12 or 52 would not appear on the X-ray film.

Since the cassette is in a slot 14, 16 or 18, there is film extending as low as surface 12, 52. Therefore, the entire body part appears when the X-ray film is developed.

I claim to have invented:

1. A device for positioning a part of a patient adjacent an X-ray cassette for the purpose of taking an X-ray, comprising:

a socket defining at least two elongated parallel slots that are closely adjacent to each other, said slots having different widths, each slot being of a size that will hold an X-ray cassette, and a plate, adjacent said socket, for receiving the part of the patient to be X-rayed, said plate being connected to said socket.

2. A device as defined in claim 1 having an X-ray cassette that has a film that has a width and height smaller than the width and height respectively of the X-ray cassette, said slot positioning the X-ray cassette so that the film in the cassette provides a picture of the part of the body that is contiguous with said plate.

3. A device as defined in claim 1, said plate having upper and lower surfaces, said surfaces having a free end for receiving the part of the patient which is to be X-rayed, said lower surface tapering toward the free end of the upper surface so that said free end may be slid under a part of a body to be X-rayed.

4. A device as defined in claim 1, a backboard, strap means for holding the body to said backboard, said plate extending between the body and said backboard to thereby position a part of said body adjacent said slots.

5. A device as defined in claim 1, in which said plate has an end, said socket being positioned at said end.

6. A device as defined in claim 1, in which said plate is a single plate; said device consisting of said plate and said socket.

7. A device as defined in claim 1, in which there are three parallel and closely adjacent elongated slots, each of the three slots having a size that fits a different cassette.

8. A device as defined in claim 1, in which said plate and socket are integrally connected to each other.

9. A device as defined in claim 1, in which said socket defines at least three closely spaced parallel elongated slots.

10. A device as defined in claim 1, in which said plate is thinner than the depth of said socket.

11. A device as defined in claim 1, in which said plate has two ends and in which all of said slots are at just one end of the plate.

12. A device for positioning a part of a patient adjacent an X-ray cassette for the purpose of taking an X-ray, comprising:

a socket having a slot for receiving an X-ray cassette, a plate connected to said socket for positioning a part of a patient adjacent said slot, said plate having upper and lower surfaces each of which has a free end, said lower surface having a slanted portion that tapers from said lower surface to the free end of said upper surface, said slanted surface being at an obtuse angle to the remainder of said lower surface and being at an acute angle to said upper surface.

13. A device as defined in claim 12, in which said plate and said socket are parts of a one piece device.

14. A device as defined in claim 12, in which said socket defines at least two parallel sockets that are closely adjacent to each other.

15. A device as defined in claim 12, in which said plate and socket are integrally connected to each other.

16. A device for positioning a part of a patient adjacent an X-ray cassette for the purpose of taking an X-ray, comprising:

a socket defining at least tyro parallel, elongated, slots that are closely adjacent to each other, the slots being of different widths so that they may receive different X-ray cassettes respectively, and means for supporting a part of a patient adjacent said socket comprising a plate extending away from said socket in a direction that is transverse to said parallel slots.

17. A device as defined in claim 16, in which said socket defines at least three parallel slots with each of the three parallel slots being closely adjacent to another one of the three parallel slots.

18. A device as defined in claim 16, in which said socket and said plate comprise a single piece.

19. A device as defined in claim 16, in which said plate is thinner than the depth of said socket.

* * * * *

UNITED STATES PATENT AND TRADEMARK OFFICE
CERTIFICATE OF CORRECTION

PATENT NO. : 5,473,664
DATED : December 5, 1995
INVENTOR(S) : Glenn G. Strawder

It is certified that error appears in the above-identified patent and that said Letters Patent is hereby corrected as shown below:

**On cover page, in the [*] Notice: change**

"Jul. 6, 2010" to: -- January 13, 2012 --.

In column 4, line 22 (claim 16, line 4), change "tyro"

to: -- two --.

Signed and Sealed this

Twenty-seventh Day of February, 1996

*Attest:*

BRUCE LEHMAN

*Attesting Officer*   *Commissioner of Patents and Trademarks*